United States Patent
Sick et al.

[11] 4,052,120
[45] Oct. 4, 1977

[54] OPTICAL APPARATUS FOR PRODUCING A LIGHT CURTAIN

[75] Inventors: Erwin Sick, Icking; Klaus Hartman, Munich, both of Germany

[73] Assignee: Erwin Sick Optik-Elektronik, Waldkirch, Germany

[21] Appl. No.: 644,910

[22] Filed: Dec. 29, 1975

[30] Foreign Application Priority Data

Feb. 26, 1975 Germany .................. 2508366

[51] Int. Cl.² ........................................... G02B 27/17
[52] U.S. Cl. ........................................... 350/6; 350/7; 350/96 R
[58] Field of Search ............... 350/6, 7, 22, 96 R, 350/96 B, 292, 288; 240/1 EL

[56] References Cited

U.S. PATENT DOCUMENTS

| | | | |
|---|---|---|---|
| 2,945,958 | 7/1960 | Morris | 350/96 R |
| 3,132,810 | 5/1964 | Ostensen | 350/96 C |
| 3,279,307 | 10/1966 | Willis, Jr. | 350/DIG. 2 |
| 3,330,190 | 7/1967 | Taillie | 350/96 R |
| 3,420,596 | 1/1969 | Osterberg | 350/96 C |
| 3,535,018 | 10/1970 | Vasilatos | 240/1 LP |
| 3,701,999 | 10/1972 | Congleton et al. | 350/6 |
| 3,728,548 | 4/1973 | Pinior | 350/96 R |
| 3,758,197 | 9/1973 | Klang et al. | 350/96R |
| 3,780,295 | 12/1973 | Kapron et al. | 350/96 C |

FOREIGN PATENT DOCUMENTS

952,388 3/1964 United Kingdom ............... 240/1 EL

*Primary Examiner*—John K. Corbin
*Assistant Examiner*—B. W. delos Reyes

[57] ABSTRACT

An optical apparatus for producing a light curtain using a fibre optic rod with a sawtooth mirror disposed along the face away from the curtain area.

36 Claims, 17 Drawing Figures

OPTICAL APPARATUS FOR PRODUCING A LIGHT CURTAIN

The invention relates to an optical device for producing a light curtain of a type having a light source supplying a collimated beam of light and a light distributing arrangement guiding the beam over the curtain area.

Light curtains are used for accident prevention and as measuring devices for detecting an obstacle at a particular point in the curtain area. Various devices have become known for producing light curtains, operating for example with successively connectable semi-conductor diodes, mirror wheels, oscillating mirrors, concave mirrors, and so forth.

The purpose of the invention consists in providing an optical device of the type mentioned above which is of simple and robust construction, reliable in operation, and permits greater or less measuring accuracy depending on the field of application. In particular, the light distributing arrangement which is disposed right on the curtain area should be of a simple, economical construction while nevertheless being capable of meeting all the demands which could be made of such a device. A plurality of light sources should be no more needed than for concave mirrors extending over the whole curtain area.

As a solution of this problem the invention provides that a fibre optic rod is used as the light distributing device into one end of which at least one light beam enters at an angle to the axis of the rod and which has, on its surface remote from the curtain area, an arrangement of adjacent inclined mirrors which slope at an angle to the rod axis such that the light beam impinging on them is deviated towards the curtain area. Thus the invention reverses the principle, known from the already familiar fibre optic rod, according to which a beam of light falling on to the specially frosted peripheral surface of a transparent rod reaches the end faces of the rod by scattering and total reflections. This reversal, however, poses the problem of a definite association between emergent and entering light. This problem is solved by the invention with the inclined mirror arrangement which ensures that the beam striking one of the inclined mirrors is only reflected towards the curtain area in a quite definite direction.

It is convenient if the fibre optic rod is rectangular, especially square, in cross-section, the inclined mirror arrangement being provided on one of the four longitudinal sides.

The inclined mirror arrangement preferably consists of sawtooth-like recesses in the rod surface, or a separate strip mounted thereon, the flanks which are struck by the light beam being silvered. Thus the inclined mirrors are all joined directly to one another and are all of identical construction.

So that the light beams entering the fibre optic rod may be able to engage at least a fairly large area of the individual inclined mirrors, they should not enter the fibre optic rod at too small an angle of incidence because otherwise the preceding inclined mirror obscures the following one, to some extent at least. To make the angle of incidence of the beams steeper, a prism is fitted, in accordance with a preferred form of construction, to the front end of the fibre optic rod (where the beam enters) and this imparts to the beams of light approaching parallel to the axis of the rod the necessary deflection towards the inclined mirror system. In accordance with a first form of construction the prism may be isosceles, its base being opposite the front end of the fibre optic rod and its side remote from the base and the front end lying on the axis of the rod. A further form of construction has a right-angled prism the hypotenuse face of which is located opposite the front end of the rod.

Although the prism may be disposed at a distance from the front end of the fibre optic rod it is preferably mounted immediately on the front end of the rod.

The inclined mirrors are conveniently disposed at an angle to the axis of the rod such that the light leaves the fibre optic rod at right angles to the rod axis. This gives a clear and geometrically defined arrangement because the beams of light extend normally to the axis of the rod.

A specially convenient practical embodiment of the idea underlying the invention is characterised in that only one beam of light enters the rod and this, by means of a periodic beam deflecting device such as a mirror wheel or a rotating or oscillating mirror, is put into a scanning motion periodically over the front end of the fibre optic rod at right angles to the axis of the rod. In this way the beam of light penetrating into the fibre optic rod sweeps successively over the inclined mirrors disposed one behind the other so that at the output of the fibre optic rod there emerges a beam of light which is executing a scanning motion substantially in the direction of the rod axis. By means of total reflections at the rod surface opposite the inclined mirror system it is also possible to utilise for the scanning process zones of the inclined mirror system which are not even impinged on directly by the entering light beam.

The angle of incidence of the light beam relative to the axis of the rod must be chosen so that there are the smallest possible dead zones at the inclined mirrors, but on the other hand so that light beams striking the rod surface from inside beside the inclined mirrors are reflected totally. The scanning height is conveniently equal to the height of the front end of the rod so that not only is a maximum longitudinal extension of the fibre optic rod utilised for the scanning but also the scanning areas of the directly incident light beam and of the totally reflected light beams meet directly with their scanning areas in the interior of the fibre optic rod. In this way a light curtain without gaps is produced.

In a further advantageous form of construction it is provided that the beam takes up only a small part of the width of the fibre optic rod and after each scanning operation in the vertical direction is shifted laterally by substantially its own width. Through this method of light guiding it is possible to increase further the measuring accuracy and the resolving power of the light curtain.

The additional lateral deflection may be brought about, for example, by surfaces of a mirror wheel which are inclined increasingly to the axis. A mirror wheel of this kind is known as a Weiller mirror wheel (Schröter, Television Dispersion Methods).

In connection with the above-described form of construction it is particularly convenient if the inclined mirror system is subdivided into a plurality of narrow zones lying one behind the other. Here, each narrow zone should have substantially the same width as the light beam and successive zones should be staggered laterally by their width. This ensures that each component beam produced by lateral displacement of the input light beam falls, either directly or through total reflection, on to one of the inclined mirror systems thus formed in accordance with the invention. Since on the other hand, through the position of the mirror wheel, for example by means of an electronic evaluation system, it is possible to establish which component beam is in fact entering the fibre optic rod, it is possible to establish an exact relationship between the output signal of the light curtain and the inclined mirror systems scanned at a certain moment.

The length of each zone conveniently corresponds to the longitudinal scanning zone of the light beams which have entered the rod, or those formed at the rod surface by total reflection.

It is advantageous if at the end of the transmitting fibre optic rod opposite that where the light enters there is provided a photo-electric receiving device for the purpose of generating a reference signal.

A specially advantageous possibility for the generation of a receiving signal consists in the provision on the side of the curtain area remote from the fibre optic rod, parallel to the latter, of a receiving fibre optic rod with a photo-receiver at at least one end.

Another particularly preferred form of construction is characterised in that the light beam coming from the light source is dispersed into a plurality of component beams by a cylinder lens screen at right angles to the scanning direction. In this construction, therefore, the lateral shifting of the component beams does not take place consecutively by means of an appropriately designed mirror wheel but simultaneously. It is thus possible in this case to use, for example, a rotating or oscillating mirror in addition for vertical scanning.

The characteristics of a cylindrical lens screen are described in the lexicon "ABC der Optik" under the key word "Linsenrasterfilm". A cylindrical lens screen may be thought of as a parallel arrangement of numerous small cylindrical lenses, each of which has, for example, a width of 1/25 mm.

If a precise correlation is required between the electrical signals received at the output of the light curtain and the individual component beams it is provided in a further form of construction, by means of a diaphragm system which can be shifted laterally periodically, that only one of the component beams can be admitted to the fibre optic rod at one time. To obtain a simple synchronisation, a further aperture cooperates in the diaphragm system with a light barrier. The light barrier indicates, for example, the moment at which the diaphragm system starts its scanning movement over the individual component beams. The necessary correlation can then be brought into effect in a suitable electronic evaluating system.

A further particularly advantageous form of construction is characterised in that the light beam from the light source is dispersed by a cylindrical lens screen in the vertical direction into a number of component beams such that at the end of the rod light beams lying one above the other fall onto successive inclined mirrors in the interior of the fibre optic rod.

In this form of construction, therefore, any kind of moving part is advantageously dispensed with since the lens screen represents an optical element which is disposed in a stationary manner. Of course, in this construction all the emergent beams leave the fibre optic rod simultaneously at an interval determined by the inclined mirror system.

Now in order to effect isolation here, provision can be made according to a further form of construction for only one of the component beams to be passed through to the fibre optic rod, this being achieved by means of a diaphragm system which can be displaced laterally periodically. Here, again, a further aperture in the diaphragm system cooperates with a light barrier thus permitting exact correlation in the electronic evaluating device between the output signals of the light curtain and an identified component beam.

A further possibility for isolating the individual emergent beams, which may also be combined with the diaphragm system referred to in the previous paragraph, consists in that the component beams are set in oscillatory motion of an amplitude such that the component beams oscillate back and forth within the inclined mirror associated with them. If the movable diaphragm system is not used it is possible to dispose, on the light exit side of the fibre optic rod, a vernier diaphragm having apertures which are aligned with the inclined mirrors. Thus, as a result of the oscillatory movement, set up by an oscillating mirror for example, only one output light beam passes at a given time through the aperture of the vernier diaphragm assigned to it.

Thus the signals picked up by the photo-receiver at the output of the light curtain are processed and investigated separately according to component beams in the electronic evaluating device.

Whereas, because of the distance in space of the individual emergent beams, the construction with the vernier diaphragm is suitable for an accident-preventive light curtain, the form of construction with the light spots produced by the component beams and oscillating back and forth within each inclined mirror is particularly adapted as a measuring light curtain because in the electronic evaluating system, through suitable synchronisation of the diaphragm system with the oscillating mirror or other oscillating device, it is possible at any moment to determine exactly the position of the individual reciprocating oscillating emergent beam. The frequency of the oscillating mirror is substantially greater than that of the diaphragm system which may preferably be advanced in a stepwise manner also from beam to another.

The periodically shiftable diaphragm system may be replaced, for example, by a photocell device which is also located opposite the transmitting fibre optic rod and which comprises a number of photocells such that one cell is associated with each inclined mirror. If the individual photocells are interrogated cyclically in succession it is possible to obtain by electronic means the same isolating effect as is achieved with the periodically shiftable diaphragm system.

It is also preferable if the receiving fibre optic rod is provided with an inclined mirror system. The advantage here is that the light striking the receiving fibre optic rod is very much better utilised because it reaches the photo-receiver without any substantial losses.

In this connection the inclined mirrors are conveniently disposed at an angle to the rod axis such that light beams falling normal to the rod axis are reflected at an angle to the rod axis lying below the total reflection critical angle. This disposition of the inclined mirrors is also regarded as preferable for the transmitting fibre optic rod. In this way the light losses are kept to a minimum.

In contradistinction to the transmitting fibre optic rod which is conveniently rectangular in section, a preferred form of construction provides that the receiving fibre optic rod is round and the inclined mirror system is formed in a narrow peripheral zone of the rod running parallel to the axis or a narrow strip recessed onto it. The round construction is particularly suitable because in this way the light striking the circumferential surface is refracted towards the narrow peripheral zone, or the strip. In this connection the width of the peripheral zone, or the strip, is conveniently such that all the light striking the opposite side and refracted towards the axis of the rod strikes the peripheral zone, or the strip. Consideration must therefore be given to the fact that a cylindrical receiving fibre optic rod is in no way an ideal imaging lens but that the refracted rays strike over a certain width range, but which if course is narrow.

In another form of construction the photo-receiver is disposed at the end of the receiving fibre optic rod which is remote from the front end which corresponds to the front end through which light enters in the transmitting fibre optic rod. This form of construction has the advantage that there is automatic compensation of absorption losses which are inevitable and are due to the total reflections in the transmitting fibre optic rod. The light beams which in the transmitting fibre optic rod cover, in fact, only a short distance before emerging, have to cover a longer distance in the receiving fibre optic rod before they reach the photo-receiver. Conversely, light beams emerging at the end of the transmitting fibre optic rod will enter the receiving fibre optic rod in the immediate vicinity of the photo-receiver so that only very small light losses take place there. Altogether, all the beams arriving at the photo-receiver will therefore be absorbed to the same extent.

A further form of construction is characterised in that there is disposed parallel to the transmitting fibre optic rod a cylindrical lens of which the caustic curve lies in the area of the receiving fiber optic rod.

This construction is particularly advantageous because in this way the light beams emerging from various areas of the transmitting fibre optic rod are all concentrated on the surface of the receiving fibre optic rod.

In this connection it is preferable if there is on the cylindrical lens a scattering element, especially a cylindrical lens screen with axes running parallel to the cylindrical lens, by means of which the cylindrical lens projects, in the position of the receiving fibre optic rod, a caustic curve arrangement which extends beyond the rod on both sides. With this type of construction there would be no disadvantageous effect from lateral relative shifts between the transmitting and the receiving system because as a result of the lateral overshoot of the receiving fibre optic rod there would always be equal quantities of light incident in the latter. This would permit easy adjustment and the arrangement could also be fitted to machines the running of which produces considerable variation.

Another advantageous form of construction is so designed that one or two receiving fibre optic rods are disposed on the same side of the curtain area as the transmitting fibre optic rod, parallel to and beside the latter, and on the other side of the curtain area is an elongated, retro-reflecting area, especially a triple reflector, which has a scattering range adequate for the illumination of the receiving fibre optic rod or rods. The advantage of this construction is that the transmitting and the receiving parts can be disposed on the one side of the curtain area and thus, for example, can be accommodated in the same housing. Then on the other side of the curtain area is only the reflector, which requires no kind of electrical connection. Of course no material must be used which is directly retro-reflective in the strictest sense of the word because a certain deflection of the returning beams is essential. However, in the case of the normally encountered ranges of measurement a scattering range of this kind is always present in normal retro-reflecting material and it must be taken into consideration that the extent of the measuring ranges, or the curtain area, is generally substantially greater than the width of the fibre optic rods. If triple mirrors are used these are conveniently ground in such a way that the main part of the retro-reflected light falls in the receiving fibre optic rod or rods.

Finally, a convenient form of construction provides that the inclined mirror system comprises at least two component inclined mirror systems running parallel to one another and mutually staggered in the longitudinal direction of the rod by at least the extent of the dead zones. This arrangement ensures that when part of the light beam strikes a dead zone there is an active reflecting mirror area present beside it. Thus the dead zone areas, which in many cases give no trouble, can be eliminated as desired.

The invention is described below with reference to the drawings in which the Figures are as follows.

Figure 1:
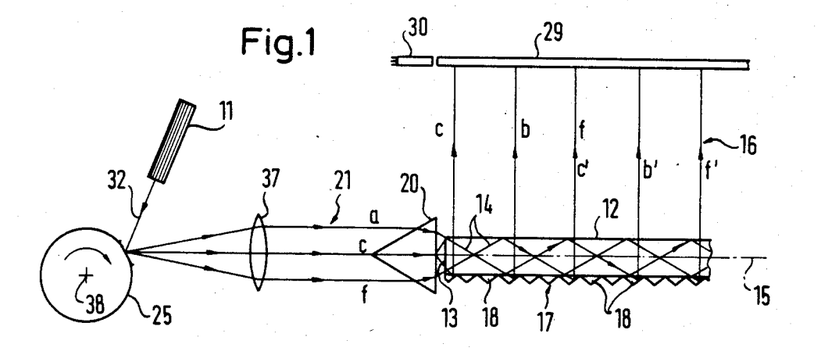
FIG. 1 is a schematic side elevation of a first form of construction of the device according to the invention.
Figure 2:
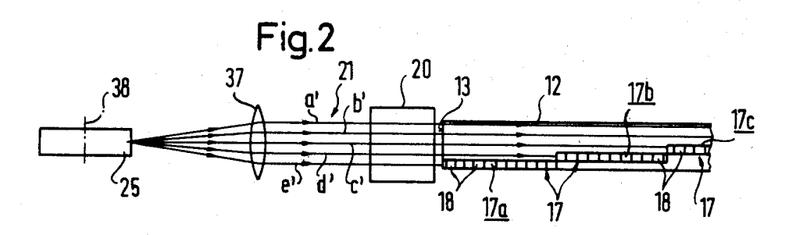
FIG. 2 is a plan view of the subject of FIG. 1.

As shown in FIG. 1 a light source 11, preferably constituted by a laser, transmits a narrow, collimated beam of light 32 onto a mirror wheel 25 rotating in the direction of the arrow, the surface of the wheel, struck by the light beam, being located at the focal point of an objective 37. The diameter of the objective is of such a size that all the light beams deflected by the mirror wheel 25 can enter the objective and emerge again parallel to one another. Of the deflected light beams three beams, a, c, f are shown by way of example behind the objective and these enter an isosceles prism, disposed in the manner shown, from which they are conducted on as light beams 14 into the interior of a fibre optic rod 12, the details of which can be seen particularly well in FIG. 3. The fibre optic rod 12 is rectangular in cross-section and on its surface remote from the curtain area 16 it has an inclined mirror system 17 which comprises individual inclined mirrors 18. As shown in FIG. 2, a plurality of narrow inclined mirror systems 17a, 17b and 17c are provided, staggered laterally one behind the other in the longitudinal direction, these being either inserted directly into the surface of the fibre optic rod 12 or, as shown in FIG. 3, located on a special strip 19 which is mounted in an optically sealed manner on the fibre optic rod 12.

The individual reflecting surfaces of the mirror wheel 25 are tilted variously, relative to the axis of rotation 38, in such a manner that the individual reflecting surfaces, shown in FIG. 2, form one after the other juxtaposed light beams $a'$, $b'$, $c'$, $d'$, $e'$. The number of laterally staggered light beams produced is dependent on the number of reflecting surfaces in the mirror wheel 25.

It is also apparent from FIGS. 1 and 2 that the light beam 32 not only scans the front end 13 of the fibre optic rod 12 periodically in the vertical direction but from one scan to another is also displaced laterally, as shown in FIG. 2.

Figure 3:
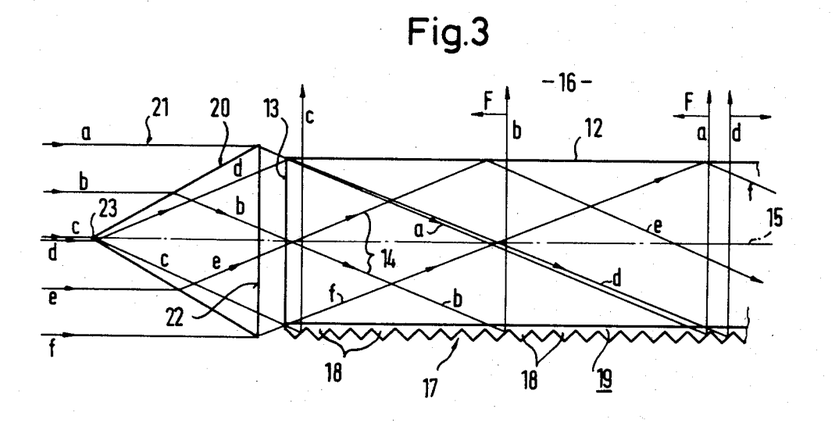
FIG. 3 is a partial elevation on a larger scale of the subject of FIG. 1 to illustrate the path of the beam in the fibre optic rod.

As a result of the vertical scanning the input beams 21, shown in FIG. 3, arrive in the sequence $a, b, c, d, e, f$ in the prism 20 of which the side 23 is remote from the end face 13 and the base lies opposite the end face 13 in question. The refraction conditions shown in FIG. 3 cause the light beam $a$ to leave the fibre optic rod 12 at the point represented and to execute a scanning movement to the left in the direction of the arrow $f$. Finally it passes into the beam $b$ or $c$. On reaching the position of the output light beam $c$ there is a jump to the output light beam $d$ which then continues the scanning in FIG. 3 to the right.

Figure 4:
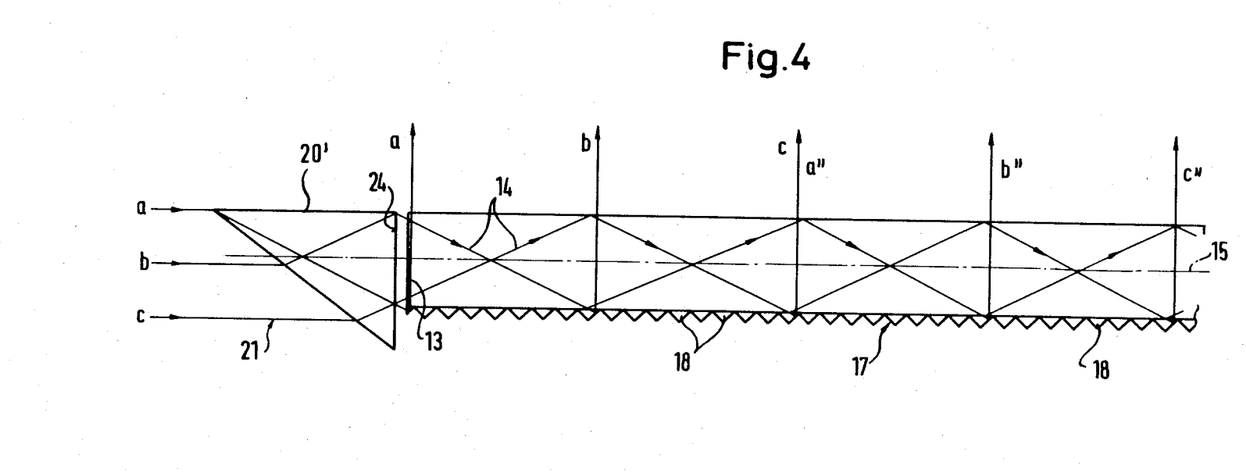
FIG. 4 is an elevation, similar to FIG. 3, showing a further form of construction.

FIG. 4 shows, in place of the isosceles prism 20 of FIG. 3, a right-angled prism 20' which is disposed in a manner which can be seen from FIG. 4. The result of this is that there is continuous scanning of the curtain area 16, in a direction from $a$ via $b$ to $c$. Because of the total reflections shown there are further scannings from $a''$ via $b''$ to $c''$, and so on.

The decoupling of the scannings, which in themselves occur simultaneously, from $a$ to $f$ in FIG. 3, or from $a$ to $c$ in FIG. 4, is effected by the above-described lateral shifting of the scanning light beam shown in FIG. 2. According to this the light beam 21 is substantially narrower than the fibre optic rod 12 so that, according to FIG. 2, it can be displaced laterally five times, for example, before it reaches the end of the rod. Now the individual narrow inclined mirror systems 17a, 17b, 17c are aligned with the individual component beams $a'$ to $e'$, each inclined mirror system being associated with one of the scanning ranges $a$ to $c$ or $a''$ to $c''$ as shown in FIG. 4. Hence each inclined mirror system receives either the whole scanning range of the directly incident light bean 14 or the whole scanning range of any one of the once-, twice-, three times-, etc., totally reflected light beams.

Since by means of an angular coder which is rotationally fixed on the mirror wheel 25 the position of the mirror wheel can be established precisely at any time by electronic means, the arrangements shown in FIGS. 1 and 3 permits an exact correlation of the output signals from the light curtain with the output beam emitted at a given moment in the curtain area 16.

As shown in FIG. 1 the receiving arrangement consists of a receiving fibre optic rod 29 which extends parallel to the transmitting fibre optic rod 12 at the other end of the curtain area 16 and at one end of which there is a photo-receiver 30, preferably in the form of a photo-multiplier, which generates an electrical signal for the electronic evaluating device proportional to the light striking the fibre optic rod 29.

It is important that the prisms 20, 20' disposed at the ends 13 of the fibre optic rod 12 impart to the light beams 21 coming in parallel to the rod axis 15 an inclination to the rod axis 15 such that the individual inclined mirrors 18 in the inclined mirror system 17 are adequately illuminated.

As can be seen from FIGS. 1 to 4, the inclined mirrors 18 are inclined to the rod axis 15 in such a way that the output light beams $a$ to $f$ emerge normally to the rod axis.

In the form of construction shown in FIG. 4 the hypotenuse face 24 of the right-angled prism 20' lies opposite and parallel to the end face 13.

Finally it must be mentioned that in all these forms of construction the fibre optic rods are illustrated broken off at the right-hand side. They should be thought of as continuing correspondingly to the right.

Figure 5:
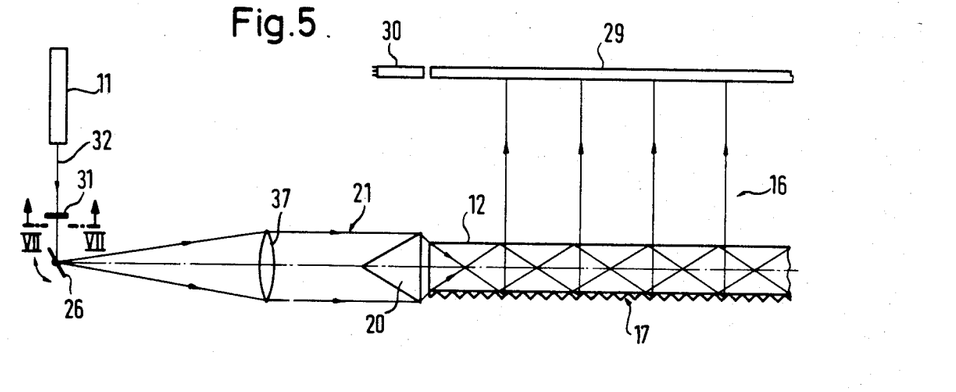
FIG. 5 is a side elevation of a further form of construction of the device according to the invention.
Figure 6:
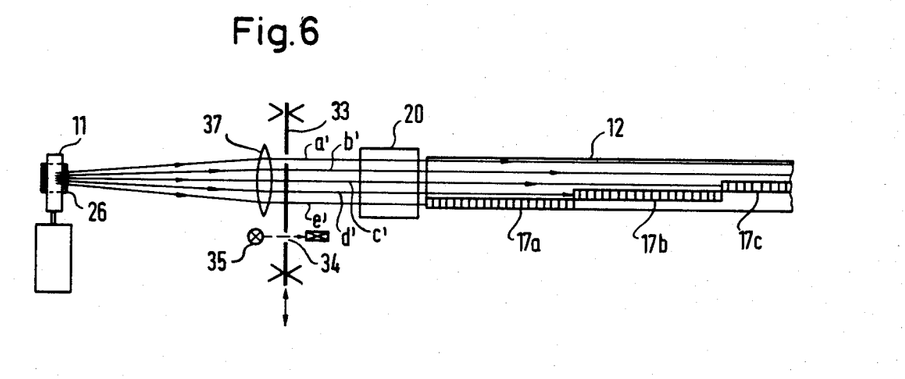
FIG. 6 is a plan view of the subject of FIG. 5.
Figure 7:
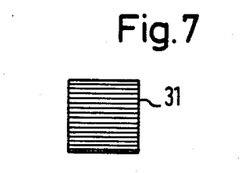
FIG. 7 is an elevation along the line VII—VII in FIG. 5.

The form of construction shown in FIGS. 5 to 7 differs from the above-described construction in that instead of the mirror wheel 25 there is reciprocating oscillating mirror 26 which lies at the focal point of the objective 37 and swings over the range shown in FIG. 5.

The lateral displacement of the scanning beam 21, which in the form of construction in FIGS. 1 and 2 is produced by a special design of the mirror wheel 25, is obtained in the construction in FIGS. 5 and 6 by means of a cylindrical lens screen 31 reproduced in plan view in FIG. 7. In the representation in FIG. 5 the cylindrical lenses of the screen 31 run parallel and in that in FIG. 6 normal to the plane of the drawing. The pattern of the cylindrical lenses is shown schematically in FIG. 7.

Since the component beams $a'$, $b'$, $c'$, $d'$ and $e'$ formed by the cylindrical lens screen 31 appear simultaneously and not, as in the construction in FIG. 1, one after the other, there is provided for the purpose of decoupling the individual component beams in the form of construction shown in FIG. 5 and FIG. 6 a diaphragm system, represented schematically in FIG. 6, which can be moved periodically backwards and forwards over the whole width of the beam in the direction of the double arrow, so that at a given moment only one of the component beams $a'$ to $e'$ can ever be incident in the prism 20. To obtain a reference signal for the movement of the reciprocating diaphragm system 33 a further aperture 34 is formed in the diaphragm for cooperation with a light barrier 35.

The width of the inclined mirror systems 17a, b, c . . . is again equal to the width of the individual component beams $a'$ to $c'$. In other respects the arrangements is analogous to that in FIG. 2.

If it is only required to detect by measuring technique some object which may penetrate into the light curtain 16 it is not necessary to provide the diaphragm system 33. A device of such a kind in itself would already be adequate for accident prevention. However, if on detection of an obstacle by the electronic evaluating device connected to the photo-receiver 30 it is also required to establish the location of a detected obstacle then it is also necessary to determine in the electronic evaluating device, by establishing the position of the oscillating mirror 26 and the component beam just allowed through the diaphragm system 32, at what point in the curtain area 16 the scanning beam is precisely located.

Figure 8:
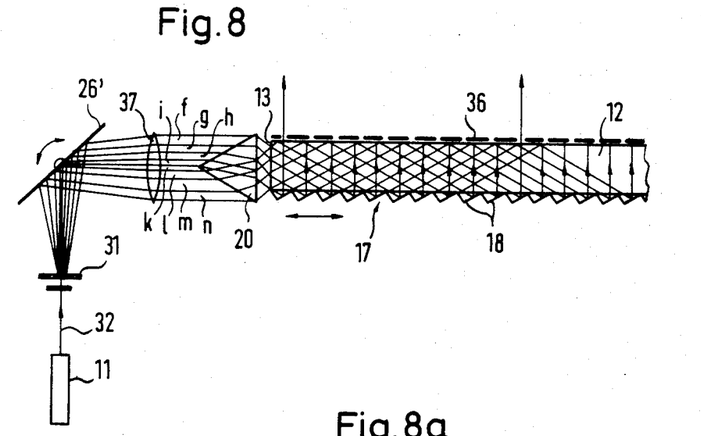
FIG. 8 is a side elevation of a further form of construction of the device according to the invention.
Figure 8A:
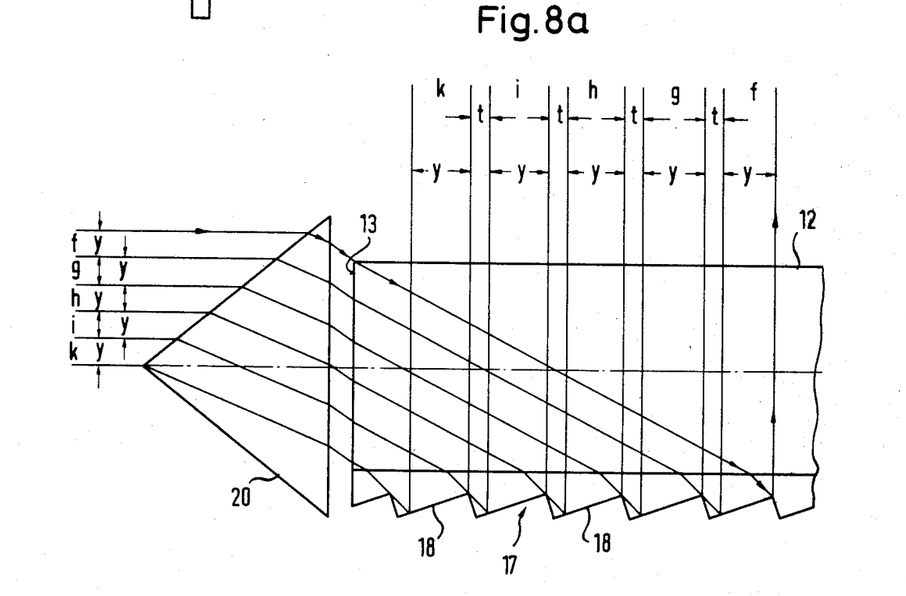
FIG. 8a is a partial elevation of FIG. 8 on a larger scale.

FIGS. 8 and 8a reproduce an embodiment of the invention which operates in a fundamentally different manner from the previous form of construction. Here the lens screen 31 has been rotated through 90° round the optical axis by comparison with the lens screen arrangement in the form of construction in FIGS. 5 to 7. The objective 37 makes the component beams of the lens screen 31, reflected by way of an oscillating mirror 26', parallel again so that they fall parallel in the manner shown, as component beams $f$ to $n$, in the component prism 20 disposed at the end 13 of the fibre optic rod 12. The disposition of the lens screen 31 is such that each of the component beams $f$ to $n$ falls exactly onto an inclined mirror 18 in the inclined mirror system 17. By means of lateral displacement and disposal one behind the other of a plurality of inclined mirror systems 17a, b, c . . . as shown in FIGS. 2 and 6, it is even possible for totally reflected constituents of the entering light beams to be guided onto further inclined mirrors within the fibre optic rod 12.

On the basis of the arrangement shown in FIG. 8, all the output beams of the fibre optic rod would normally appear simultaneously. They are also at a certain distance from one another depending on the screen constant of the mirror screen. Such an arrangement in itself would be adequate as an accident-preventive light curtain. It is characterised in that every kind of moving part has been dispensed with.

However, a device giving finer differentiation is shown in FIG. 8, wherein a vernier diaphragm 36 is mounted on the output side of the fibre optic rod 12 and has an aperture opposite each of the inclined mirrors 18. However, the apertures are mutually staggered in the manner of a vernier as represented. If, now, the rotating mirror 26' is set in oscillation in the direction of the double arrow so that the individual light spots on the inclined mirrors 18 in FIG. 8a execute an oscillatory movement $y$ within each individual associated inclined mirror, it is obvious that at a given time a light beam will emerge from only one of the apertures in the vernier diaphragm in FIG. 8. Thus again, by electronic determination of the position of the oscillating mirror 26' at any moment it is possible to obtain a clear correlation between the output signal from the light curtain measured by the receiver 30 and the momentary location of the output light beam. Of course the scanning beam jumps on in conformity with the interval between the apertures of the vernier diaphragm 36.

Figure 9:
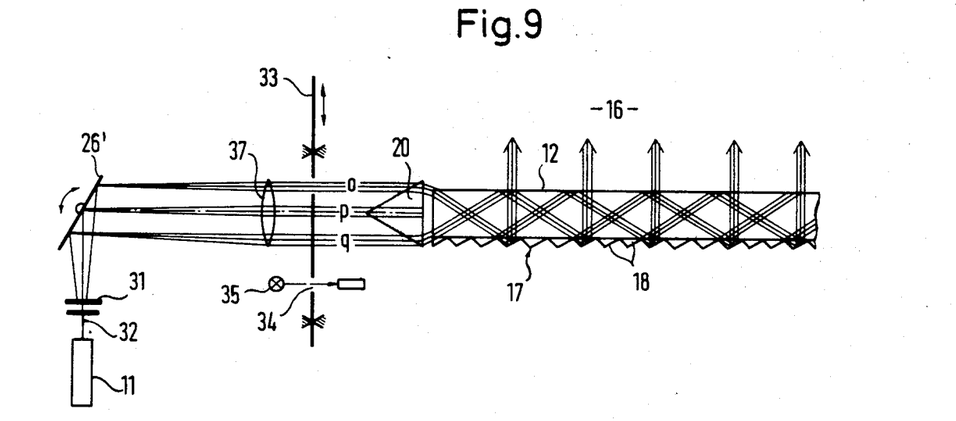
FIG. 9 is a further form of construction in side elevation.

Whereas the form of construction shown in FIG. 8 is useful particularly for accident-preventive light curtains, the construction to be described now, shown in FIG. 9, is specially adapted for a measuring light curtain. The arrangement of the lens screen 31, the oscillating mirror 26', the objective 37, the prism 20 and the fibre optic rod 12 is analogous to the form of construction shown in FIG. 8. To simplify the illustration only three, $o$, $p$, and $q$ of the component beams produced by the screen or lenses 31 have been shown in FIG. 9. Here again the oscillating mirror 26' imparts a periodic reciprocating motion to the light spots produced on the inclined mirrors 18 within the inclined mirror associated with them. This oscillatory motion, indicated in FIG. 8a by the letter $y$, is illustrated in FIG. 9 by a representation of the individual beams with three strokes. Now, if by means of a diaphragm system 35 which can be moved periodically back and forth in the direction of the double arrow it is ensured that any given moment only one of the component beams $o$, $p$, $q$ enters the prism 20, it is possible by electronic means to establish an exact correlation between the light beam which is just entering the curtain area 16 and the electrical signal emitted by the photo-receiver 30. In contradistinction to the previous forms of construction, however, this signal is also modulated by the reciprocating motion of the oscillating mirror 26', so that for example a very fine object can be located very precisely within a single output component beam $f$, $g$, $h$, $i$, $k$. Thus the form of construction shown in FIG. 9 permits an extremely fine determination in space, of objects having an extension less than the longitudinal extension of the inclined mirrors 18.

The decoupling of the individual component beams by means of the diaphragm system 33 is given by way of example only. Any other possibility of decoupling, including for example an electronic decoupling arrangement, may be regarded as equivalent.

As already mentioned, only three component beams $o$, $p$, $q$ have been represented by way of example in FIG. 9. The practical embodiment is such that the number of component beams entering the fibre optic rod permits successive inclined mirrors each to receive one component beam which is then set in reciprocating motion by the oscillating mirror 26' within the following mirror.

Figure 10:
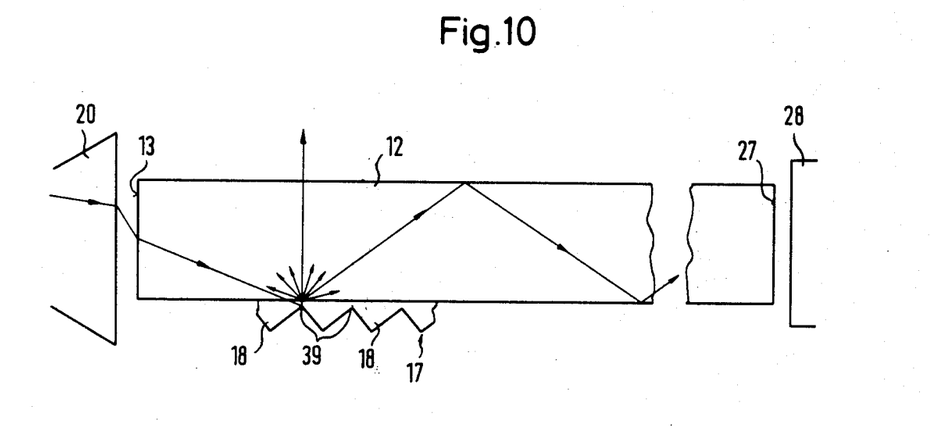
FIG. 10 is a side elevation on a larger scale of a fibre optic rod used in the device according to the invention with the adjacent constructional parts to illustrate the generation of a reference signal.

FIG. 10 shows how, according to the invention, a reference signal can easily be obtained for the luminous intensity of the incident light beam. Since light is scattered at the sides 39 of the inclined mirrors 18 of the system 17 in the manner shown, a certain proportion of the input light always reaches the end face 27 opposite the surface 13, where a photo-electric receiver 28 preferably in the form of a photo-multiplier, can be disposed which supplies the reference signal for the brightness of the input light beam to the electronic evaluating device.

In all forms of construction the light source 11 is preferably constituted by a laser.

Figure 11:
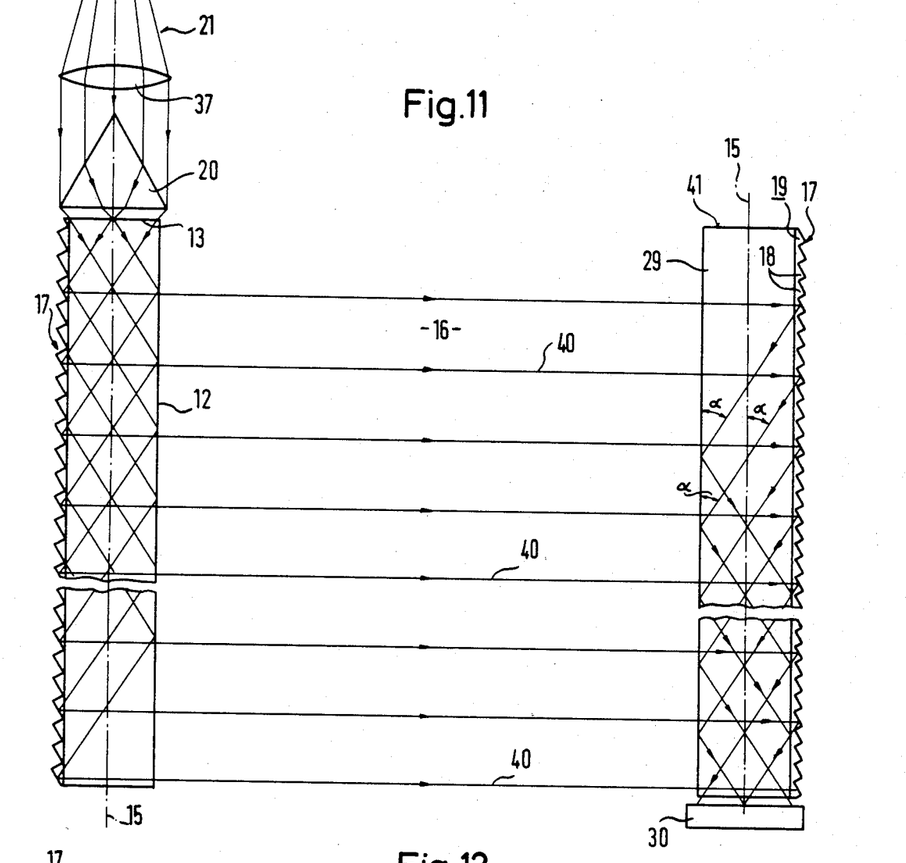
FIG. 11 is a schematic plan view of a light curtain designed according to the invention, to illustrate a particularly advantageous construction for the receiving fibre optic rod.

FIG. 11 shows a transmitting fibre optic rod arrangement which may correspond to any of the previous examples of construction. However, the light beams 40 passing through the curtain area 16 enter a specially designed fibre optic rod 29 at the end of the curtain area 16. As can be seen from FIGS. 11 and 12 the receiving fibre optic rod 29 has a round cross-section and on its circumferential surface opposite the light entry side it has a narrow inclined mirror system 17 which is constructed on a strip 19 fitted in a lightproof manner. Even without the cylindrical convergent lens 42 shown in FIG. 12 the refractive effect of the round rod 29 causes the parallel incident light 40 to be concentrated in the region of the inclined mirror system 17. Since the angles of the inclined mirrors 18 relative to the axis of the rod 15 are chosen to be such that the reflected beams which strike the opposite circumferential surface at an angle $\alpha$ to the axis of the rod, are reflected totally at the smooth circumferential surfaces of the rod 29, the light which strikes the fibre optic rod 29 reaches the photo-receiver 30 in its entirety apart from the absorption losses which are inevitable.

The photo-receiver 30 is intentionally disposed on the end surface of the receiving fibre optic rod 29 opposite the front end 41 and the front end 41 is located at the same level as the front end for light entry 13 of the transmitting fibre optic rod 12. This arrangement ensures that all the light beams entering the transmitting fibre optic rod 12 and emerging from the receiving fibre optic rod 29 cover substantially the same path within the two fibre optic rods so that the total light absorption is approximately the same for every individual component beam.

Figure 12:
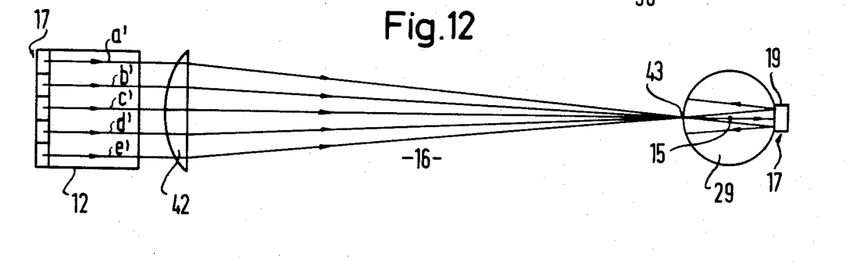
FIG. 12 is an elevation of the form of construction in FIG. 11, looking along the axes of the rod, a convergent lens also being provided additionally.

FIG. 12 shows how a cylindrical converging lens 42 can be disposed near and parallel to the transmitting fibre optic rod 12 to concentrate incoming light in a caustic curve 43 on the surface of the fibre optic rod 29. This ensures that all the component beams $a'$, $b'$, $c'$, $d'$, $e'$ (FIGS. 2 and 6) obtained by lateral displacement are completely directed into the receiving fibre optic rod 29.

Figure 13:
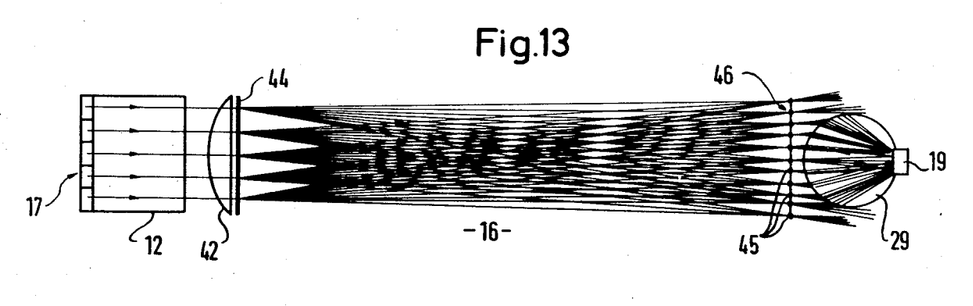
FIG. 13 is an end view, similar to FIG. 12, but with another optical variant.

As shown in FIG. 13 a scattering element 44 may also be added to the cylindrical lens 42 to produce the optical effect shown by the beam path in FIG. 13, namely that in place of a caustic curve 43 as in FIG. 12 a juxtaposed arrangement 46 of a plurality of caustic curves 45 is obtained the arrangement 46 projecting beyond the fibre optic rod 29 bilaterally. In any case, however, a cylindrical lens screen is particularly suitable as the scattering element, with its individual lenses extending parallel to the cylindrical lens 42.

The form of construction in FIG. 13 has the advantage that lateral displacement of the receiving fibre optic rod 29 relative to the transmitting fibre optic rod 12 will have no disturbing effect on a measuring operation. In this connection therefore the lateral overshooting of the fibre optic rod 29 is particularly important.

Figure 14:
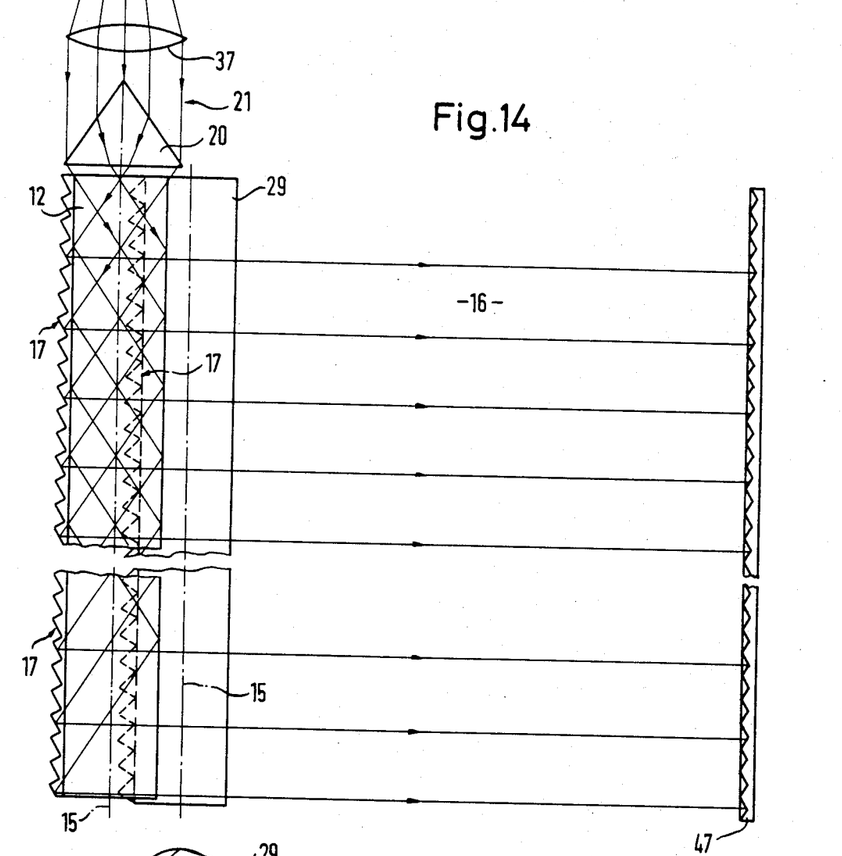
FIG. 14 is a plan view of a further form of construction of the light curtain according to the invention with all the fibre optic rods disposed on one side.
Figure 15:
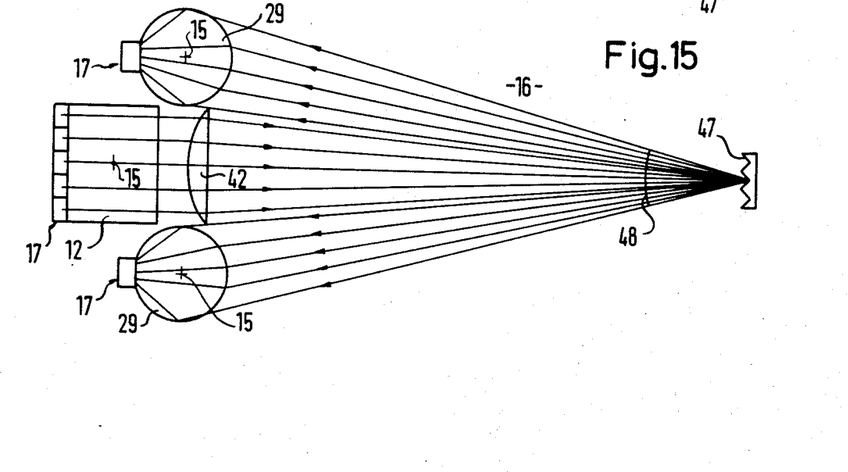
FIG. 15 is an elevation of the light curtain of FIG. 14 in the direction of the axes of the rod.

Finally, a form of construction is represented in FIGS. 14 and 15 wherein two receiving fibre optic rods 29 are disposed on the transmission side parallel to the transmitting fibre optic rod 12.

On the opposite side of the curtain area 16 is an elongated triple reflector 47 which extends parallel to and to the same length as the transmitting and the receiving fibre optic rods 12, 29. If the light emerging from the transmitting fibre optic rod 12 is concentrated by the cylindrical lens 42 in the manner shown in FIG. 15, a triple mirror of relatively narrow construction is sufficient.

The important point about the reflector 47 is that it does not possess strictly retro-reflecting properties but has an scattering range 48 by reason of which the reflected light is also able to some extent to enter the receiving fibre optic rods 29, past the transmitting fibre optic rod. Instead of two receiving fibre optic rods it is also only necessary, with this form of construction, to provide one fibre optic rod 29.

Figure 16:
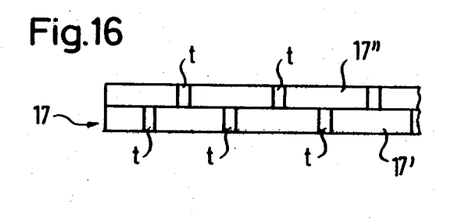
FIG. 16 is a schematic plan view of part of a specially preferred inclined mirror arrangement for the device according to the invention.

FIG. 16 shows a schematic plan view of an inclined mirror arrangement 17 such as is used preferably on the transmitting side. Since the inclined mirror arrangement possesses certain dead zones $t$, it might be considered a disadvantage in certain applications for the curtain area 16 to show corresponding discontinuities. This can be obviated if the inclined mirror arrangements 17 on the transmitting side, in the FIG. 16 construction, are cut up in the longitudinal direction and the two resultant component inclined mirror systems 17', 17" are mutually offset in the longitudinal direction of the transmitting fibre optic rod 12 in such a way that the dead zones of the two component systems 17', 17" are separated by a distinct interval from one another in the longitudinal direction. This arrangement ensures that light can be reflected from all areas of the transmitting fibre optic rod 12 and so it is not necessary to allow for any discontinuities in the curtain area 16.

We claim:

1. An optical apparatus for producing a light curtain, having a light source emitting a collimated beam of light, and a light distributing system guiding the light beam over the curtain area, comprising a fiber optic rod having two end faces, one of said end faces receiving at least one light beam entering at an angle to the axis of the rod, means for introducing said light beam at said angle and a system of adjacent inclined mirrors, arranged one next to the other, said mirrors inclined at an angle to the axis of the rod, such that light beams striking them are deflected towards the curtain area, and outwardly of the rod, at the same plane, with said system extending longitudinally on the surface of the rod parallel to the axis thereof and remote from the curtain area.

2. Apparatus according to claim 1, wherein the fibre optic rod is rectangular in section, and the inclined mirror system is provided on one of the four longitudinal sides.

3. Apparatus according to claim 1, wherein on the end face of the fibre optic rod where the beam enters there is a prism which imparts to light beams arriving parallel to the axis of the rod the necessary deflection towards the inclined mirror system.

4. Apparatus according to claim 3, wherein the prism is isosceles, its base is situated opposite said end face of the fibre optic rod and the prism side remote from the base and from the end face of the rod lies on the axis of the rod.

5. Apparatus according to claim 3, wherein the prism is right-angled and its one hypotenuse face is situated opposite the said end face of the rod.

6. Apparatus according to claim 3, wherein the prism is placed directly on said end face of the fibre optic rod.

7. Apparatus according to claim 1, wherein the inclined mirrors are disposed at an angle to the axis of the rod such that the light emerges from the fibre optic rod normally to the axis of the rod.

8. Apparatus according to claim 1, wherein a light beam enters the rod which, by means of a periodic beam deflecting device, is set in a scanning movement periodically over said end face of the fibre optic rod normally to the axis of the rod.

9. Apparatus according to claim 8, wherein the angle of incidence of the light beam to the rod axis lies between 30° and 50°.

10. Apparatus according to claim 8, wherein the scanning height is equal to the height of said end face of the rod.

11. Apparatus according to claim 8, wherein the beam occupies only a fraction of the width of the fibre optic rod and is shifted laterally by substantially its width after each scanning in the vertical/direction.

12. Apparatus according to claim 11, wherein the additional lateral deflection is effected by surfaces of a mirror wheel which are inclined increasingly to the axis.

13. Apparatus according to claim 11, wherein the inclined mirror system is subdivided into a plurality of narrow regions lying one behind the other, and wherein light beams deflected by each of said narrow regions are in the same plane.

14. Apparatus according to claim 13, wherein each narrow region has substantially the same extension in width as the light beam and successive regions are staggered relative to one another laterally by their width.

15. Apparatus according to claim 13, wherein the extension in length of each said region corresponds to the longitudinal scanning range of the light beam entering the rod, or the light beams formed by total reflection at the rod surface.

16. Apparatus according to claim 8, wherein the light beam derived from the said light source is split into a plurality of component beams by a cylindrical lens screen at right angles to the scanning direction.

17. Apparatus according to claim 16, wherein by means of a diaphragm system which can be shifted laterally periodically, only one of said component beams is allowed through at a time to the fibre optic rod.

18. Apparatus according to claim 17, wherein a further aperture in the diaphragm system cooperates with a light barrier.

19. Apparatus according to claim 8, wherein to obviate dead zones, scanning light beams are passed into the fibre optic rod from both end faces, the arrangement at the second end face being analogous to that at the first end face.

20. Apparatus according to claim 1, wherein a photoelectric receiving arrangement is provided at the end face of the rod opposite to that of the entry of the light in order to generate a reference signal.

21. Apparatus according to claim 1, wherein a receiving fibre optic rod with a photo-receiver at one end face at least is provided on the side of the curtain area remote from the fibre optic rod parallel to the curtain area.

22. Apparatus according to claim 21, wherein the receiving fibre optic rod is also provided with an inclined mirror arrangement.

23. Apparatus according to claim 22, wherein the inclined mirrors are disposed at an angle to the rod axis such that light beams falling normally to the rod axis are reflected at an angle to the rod axis which is below the critical angle of total reflection.

24. Apparatus according to claim 23, wherein the circumferential zone, or the strip, is of such a width that substantially all the light incident from the transmitting rod and refracted towards the rod axis strikes the circumferential zone or the strip.

25. Apparatus according to claim 22, wherein the receiving fibre optic rod is round and the inclined mirror arrangement is formed in a narrow circumferential zone of the rod running parallel to the axis or on a narrow strip disposed thereon.

26. Apparatus according to claim 21, wherein the photo-receiver is disposed at the end of the receiving fibre optic rod which is remote from the end face which corresponds to the light entry end face of the transmitting fibre optic rod.

27. Apparatus according to claim 21, wherein a cylindrical lens, the caustic curve of which lies within the region of the receiving fibre optic rod, is disposed parallel to the transmitting fibre optic rod.

28. Apparatus according to claim 27, wherein on the cylindrical lens there is a cylindrical lens screen with axes running parallel to the cylindrical lens, by means of which the cylindrical lens projects, in the position of the receiving fibre optic rod, a caustic curve system projecting bilaterally beyond the rod.

29. Apparatus according to claim 1, wherein the light beam from the light source is split up by a cylindrical lens screen in the vertical direction into a number of component beams such that at the end face of the rod light beams lying one above the other fall onto successive inclined mirrors.

30. Apparatus according to claim 29, wherein said component beams are set in oscillatory motion at an amplitude such that the complnent beams swing back and forth within the bounds of the inclined mirror associated with them.

31. Apparatus according to claim 30, wherein a vernier diaphragm with apertures aligned with the inclined mirrors is disposed at the light exit side of the fibre optic rod.

32. Apparatus according to claim 31, wherein the signals received by a photo-receiver at the output of the light curtain are processed and investigated separately in respect of said component beams in an electronic evaluating device.

33. Apparatus according to claim 30, wherein by means of a periodically laterally displaceable diaphragm system only one of the component beams is allowed through at a time to the fibre optic rod.

34. Apparatus according to claim 1, wherein the inclined mirror system consists of at least two component inclined mirror systems running parallel to one another in the longitudinal direction of the rod by at least the extent of the dead zones.

35. In an optical apparatus for producing a light curtain, a fibre optic rod which is round in cross-section, having a light entry side for receiving light from the curtain area and a circumferential surface opposite said light entry side, said rod comprising a system of adjacent inclined mirrors, arranged one next to the other, said system attached to a narrow zone of the circumferential surface of said rod, running parallel to the axis thereof and said mirrors disposed at an angle to the axis of said rod, such that substantially all of the light entering the rod, normally to the axis thereof, is reflected outwardly thereof at an angle to the rod axis lying below the total reflection critical angle.

36. An optical apparatus for producing a light curtain, having a light source emitting a collimated beam of light, and a light distribution system, guiding the light beam over the curtain area, comprising a transmitting fiber optic rod having two end faces, one of said end faces receiving at least one light beam entering at an angle to the axis of the rod, means for introducing said light beam at said angle, a system of adjacent inclined mirrors, said mirrors inclined at an angle to the rod axis such that said light beam striking them is deflected towards the curtain area with said system located on the surface of the rod remote from the curtain area, a receiving fibre optic rod, disposed on the same side of the curtain area as the transmitting fiber optic rod, parallel to and beside the latter, and an elongated retro-reflecting region located on the other side of the curtain area, said retro-reflecting region having a scattering range adequate for illumination of the receiving fiber optic rod.

* * * * *